Figure 5:
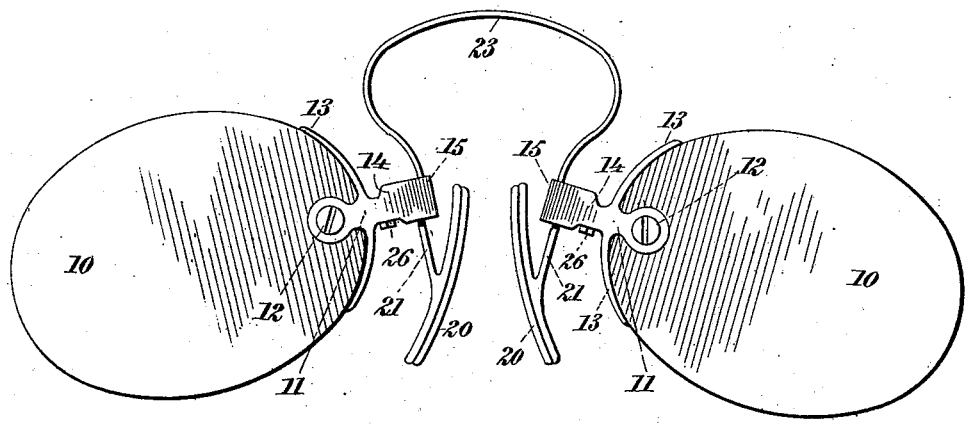

H. P. ALEXANDER.
EYEGLASSES.
APPLICATION FILED JULY 5, 1907.
906,360.
Patented Dec. 8, 1908.
2 SHEETS—SHEET 1.
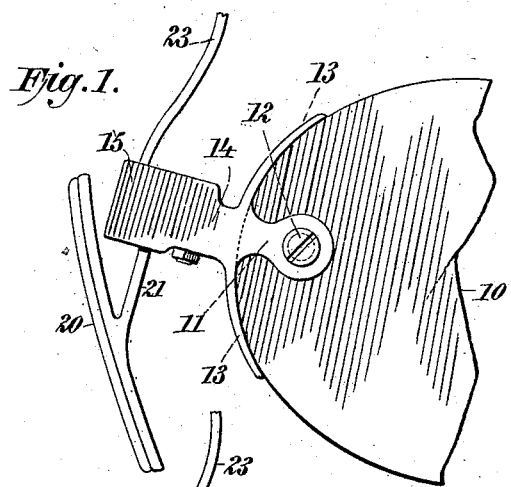
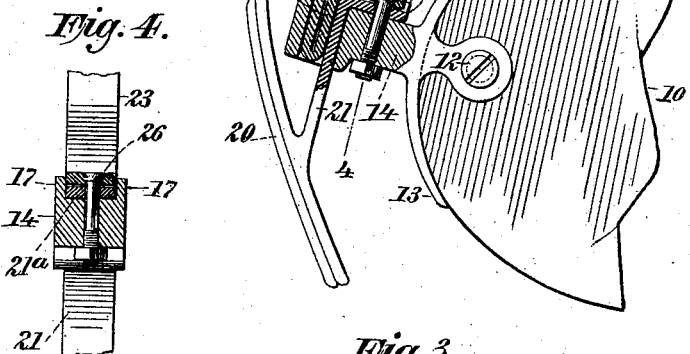
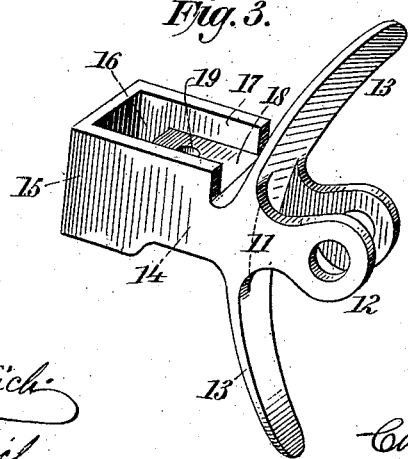
WITNESSES:
INVENTOR
Henri P. Alexander
BY
his ATTORNEY

H. P. ALEXANDER.
EYEGLASSES.
APPLICATION FILED JULY 5, 1907.

906,360.

Patented Dec. 8, 1908.

2 SHEETS—SHEET 2.

WITNESSES:

INVENTOR
Henri P. Alexander
BY
Conrad A. Dieterich
his ATTORNEY

UNITED STATES PATENT OFFICE.

HENRI P. ALEXANDER, OF NEW YORK, N. Y.

EYEGLASSES.

No. 906,360.   Specification of Letters Patent.   Patented Dec. 8, 1908.

Application filed July 5, 1907. Serial No. 382,173.

*To all whom it may concern:*

Be it known that I, HENRI P. ALEXANDER, a citizen of the United States, residing at the city of New York, borough of Manhattan, in the county and State of New York, have invented certain new and useful Improvements in Eyeglasses, of which the following is a full, clear, and exact specification.

My invention relates to improvements in eyeglasses, and the same has for its object more particularly to provide a simple, efficient and reliable means for securing the spring or bow to the lenses or lens frames in such a manner that the same will not become loose.

Further, said invention has for its object to provide a construction wherein the screw, rivet or other means for securing the ends of the bow or spring is so arranged and located that the same will not come into contact with the nose of the wearer.

Further, said invention has for its object to provide a construction wherein the lowermost portions of the bow or spring will be strengthened or reinforced.

Further, said invention has for its object to provide a construction wherein the lowermost portions of the springs will be so secured as to be free from all lateral movement, and the extreme ends thereof secured to the lens frames or boxes in a plane parallel with the longitudinal axis of the lenses.

To the attainment of the aforesaid objects and ends my invention consists in the novel details of construction, and in the combination, connection and arrangement of parts hereinafter more fully described, and then pointed out in the claims.

In the accompanying drawings forming part of this specification, wherein like numerals of reference indicate like parts, Figure 1 is a side view showing a portion of a pair of eyeglasses constructed according to, and embodying my said invention; Fig. 2 is a similar view, partly broken away, to show the manner of securing the ends of the bow or spring to the lens frame; Fig. 3 is an enlarged detail perspective view showing the frame portion and box detached from the lens and bow; Fig. 4 is a detail section taken on the line 4—4 of Fig. 2, and Fig. 5 is a side view of a complete pair of eyeglasses.

In said drawings 10 designates a lens of usual construction, and 11 the attaching piece which is bifurcated and provided with apertures to receive a screw 12 which passes through the lens 10 near its inner edge.

13, 13 denote curved wings which extend upward and downward from said attaching piece, and contact closely with the inner edge of the lens.

From the outer side of the attaching piece 11 extends an integral post 14 which terminates in a rectangular box 15 having a rectangular vertical opening 16 extending therethrough, and an upwardly projecting rim or flange 17 arranged along the upper edge of said box. The upper portion of the post 14 intermediate the vertical opening 16 and the wings 13, 13 is provided with a flat bearing surface 18, and 19 denotes an aperture extending vertically through said post 14.

20 denotes a nose-piece having an upwardly projecting attaching arm 21 which is passed through the opening 16 in said box 15 and its free end 21ª bent at right angles to the remainder of said arm and said bent-over end provided with an aperture which registers with the aperture 19 in the post 14.

23 denotes the spring having each of its lower end portions doubled or folded upon itself to form a reinforced portion 24, and its extreme ends bent outwardly at right angles to said folded portions 24 24 forming offset members 25, 25, provided with apertures 26 26 which register with the apertures in the end of the arm 21 and the aperture 19 in the post 14 when the folded ends of the spring are properly inserted in the boxes 15 between the inner walls of said box and the portions of the arms 21 therein, and the same then firmly secured together by screws or bolts 27 27 passing through the apertures in said spring 23, attaching arms 21, 21 and posts 14, 14.

It is to be noted particularly that in my improved construction the eyeglasses present no rough or projecting portions at the point where the spring, nose-piece, attaching arms and parts are secured together, liable to injure the wearer, and that the extremities of said united parts are all substantially inclosed or protected by the box and the flange at its upper edge.

Further, it is to be noted that by passing the ends of the spring and attaching arm of the nose-piece through the box, which practically completely fill said box, and then bending the ends of said spring to form offset portions and the ends of said attaching arm at right angles to their main portions, arranging the said offset portions and ends to lie parallel to each other and then securing said ends together by a fastening device traversing said parts at right angles to the longitudinal axis of the lenses, the possibility of said parts twisting or working loose is entirely overcome, and a neat, inexpensive and rigid joint produced.

Having thus described my said invention, what I claim and desire to secure by Letters Patent is:

1. A pair of eyeglasses comprising a pair of posts, means for securing a pair of lenses thereto, a spring having ends adapted for engagement with said posts at right angles to and parallel with the longitudinal axes of said lenses, and means for securing said ends to said posts, substantially as specified.

2. A pair of eyeglasses comprising a pair of posts, means for securing a pair of lenses thereto, a spring having portions adapted for engagement with said posts at right angles to the longitudinal axes of said lenses, and provided with members adapted for securement to said posts parallel to the longitudinal axes of said lenses, nose pieces having their ends also adapted for securement to said posts, and securing means traversing the ends of said nose pieces and said members transversely to the longitudinal axes of said lenses, substantially as specified.

3. A pair of eyeglasses comprising a pair of posts, attaching means thereon adapted to receive a pair of lenses, boxes on said posts, nose pieces provided with members disposed in said boxes, and having their ends projecting out of the same, a spring partly disposed in said boxes and provided with lateral projections extending out of said boxes, and means for securing the ends of said nose pieces and said lateral projections to said posts, substantially as specified.

4. A pair of eyeglasses comprising a pair of posts, attaching means thereon adapted to receive a pair of lenses, boxes on said posts and a spring having portions disposed in said boxes and provided with lateral projections, a pair of nose pieces provided with projecting members, said lateral projections and the projecting members of said nose pieces having their ends extending out of said boxes, and means for securing said lateral projections and said projecting members to said posts, substantially as specified.

5. A pair of eyeglasses comprising a pair of posts each having attaching means at one end adapted to receive a lens and a box on the other end, a spring having its ends disposed in said box and provided with lateral projections a pair of nose pieces provided with attaching members extending through said boxes and contacting with the portions of the spring disposed therein, said lateral projections and attaching members projecting out of said boxes, and means for securing the projecting portions of said lateral projections and attaching members together and to said posts, substantially as specified.

6. A pair of eyeglasses comprising a pair of posts each having attaching means at its outer end adapted to receive a lens, and a box at its inner end, a spring having its ends located in said boxes and lateral projections extending therefrom adjacent to its ends, a pair of nose pieces provided with attaching arms disposed in said boxes and provided at their ends with projecting portions registering with the lateral projections on said spring, and means for jointly securing said projections to said posts outside of said boxes, substantially as specified.

7. A pair of eyeglasses comprising a pair of posts each having attaching means at its outer end adapted to receive a lens, and a box at its inner end provided with a vertical opening, a spring having its ends doubled and provided with a lateral projection, a pair of nose pieces having attaching arms provided with lateral projections at their ends, said attaching arms and the doubled portions of said spring being disposed in the vertical openings in said boxes, and their lateral projections secured together and to said posts intermediate the boxes and attaching means thereon, substantially as specified.

8. A pair of eyeglasses comprising a pair of posts each having attaching means at its outer end adapted to receive a lens, and a box at its inner end provided with a vertical opening, a spring having the portions adjacent to its ends doubled and disposed in the vertical openings in said boxes and its ends arranged at right angles to said doubled parts, a pair of nose pieces having attaching arms passed through said openings, and their free ends bent at right angles to the main portions of said arms, and a device extending through the ends of said spring and arms for securing the same to said posts intermediate the boxes and attaching means thereon, substantially as specified.

9. A pair of eyeglasses comprising a pair of posts each having attaching means at its outer end adapted to receive a lens, and a box at its inner end provided with a vertical opening, and a flat bearing surface intermediate said attaching means and box, a spring having its ends bent outward and inward against its main portion, and its ends bent outward again at right angles to said doubled parts, and said doubled parts disposed within the vertical openings in said boxes, nose pieces each having an attaching arm passed through the vertical opening in said box, and its end bent at right angles to said arm and arranged intermediate the end of the spring and the post, and a fastening device extending through the ends of said spring and attaching arm, and into said post at right angles to the longitudinal axis thereof, substantially as specified.

10. A pair of eyeglasses comprising a pair of posts each having attaching means at its outer end adapted to receive a lens, and a box at its inner end provided with a vertical opening and a rim along its upper edge, a spring having its ends bent outward, inward, and outward again at right angles to said doubled parts, and said doubled parts disposed in the vertical openings in said boxes, nose pieces each having attaching arms passed through the vertical openings in said boxes, and their ends bent at right angles to the main portions of said arms, and a fastening device extending through the bent ends of said spring and attaching arms for securing the same to said posts within the rims along the upper edges of the boxes thereon, substantially as specified.

Signed at the city of New York, in the county and State of New York, this twenty-seventh day of June, nineteen hundred and seven.

HENRI P. ALEXANDER.

Witnesses:
CONRAD A. DIETERICH,
A. R. ANGUS.